Patented Aug. 24, 1926.

1,597,186

UNITED STATES PATENT OFFICE.

JOSEPH FOUSEK, OF SAN FRANCISCO, CALIFORNIA.

METHOD OF PRESERVING FROZEN EGG YOLKS.

No Drawing.      Application filed April 20, 1925. Serial No. 24,683.

The present invention relates to methods for preparing and preserving frozen egg yolks for baking purposes, and more particularly to the frozen products shipped in cold storage in sealed containers and delivered thus, and largely used by bakers in the production of pastry.

As is well known in this industry, the yolks only of the eggs are sealed in containers, frozen, and shipped in cold storage to market points and from thence distributed directly to the bakeries for use, the product in this form having had that portion, the albumen, most susceptible to deterioration, through decomposition, removed.

The usual practice with bakers is to open these containers, as required for use, and admix the frozen, or partly thawed out, contents directly with the other ingredients constituting the bakery batch, resulting in a condition, as to temperature, directly opposed to that required for the proper leavening of the composition, or mixture, to say nothing of the incorporation therein of certain objectionable odors retained by the eggs that had been received through improper food fed to the fowls producing them.

In addition to the mixture obtained by the admixture of the eggs in the condition stated being of a most unsatisfactory character, the baker is confronted with the certainty of rapid deterioration and decomposition of his eggs, once opened and thawed out.

The object of my invention is to provide a composition of the character designated of creamy-like consistency, that may be kept as prepared indefinitely, that will ripen or improve with age, that will be deodorized and purified; and one that will prove a fit and healthful constituent in pastry productions of quality.

In the preparation of my self-preserving composition, strict adherence to the following process is an absolute requirement, if most satisfactory results would be obtained.

The sealed containers with their frozen contents, after being received from cold storage, are allowed to stand unopened for a period of some four days at a temperature of eighty degrees Fahrenheit, to insure perfect thawing out of the contents, after which the containers are opened and their contents removed to a mixing receptacle, to be immediately followed by the addition thereto, for every 13 pounds of yolks of eggs, either frozen or fresh, of 9 pounds of sugar;

3 pounds of honey, or syrup, either cane or corn;

6 ounces of salt.

The syrup acts more particularly as a mass softener, or solvent, to produce a smooth, ungranulated mixture, while at the same time, in combination with the sugar, providing the necessary preserving agency. After thorough incorporation, the composition should be allowed to stand from three to seven days, depending upon climatic conditions, to ripen, when it will be found in condition to produce excellent results, and that, thereafter, it will continue to improve with age.

Having thus described my process for preparing and preserving eggs for bakers' use, I claim, and desire to secure by Letters Patent:

The method of preserving egg, which consists of first freezing a mass of egg yolks in mass in containers, thereafter exposing the frozen mass to an approximate temperature of eighty degrees Fahrenheit for about four days, then removing the thawed-out mass from the containers and immediately incorporating therewith sugar, salt, and syrup, as a mass softener and preservative, and allowing the admixture to stand for a period of from three to seven days for ripening purposes.

In testimony whereof I have affixed my signature.

JOSEPH FOUSEK.